United States Patent Office 2,821,672
Patented Jan. 28, 1958

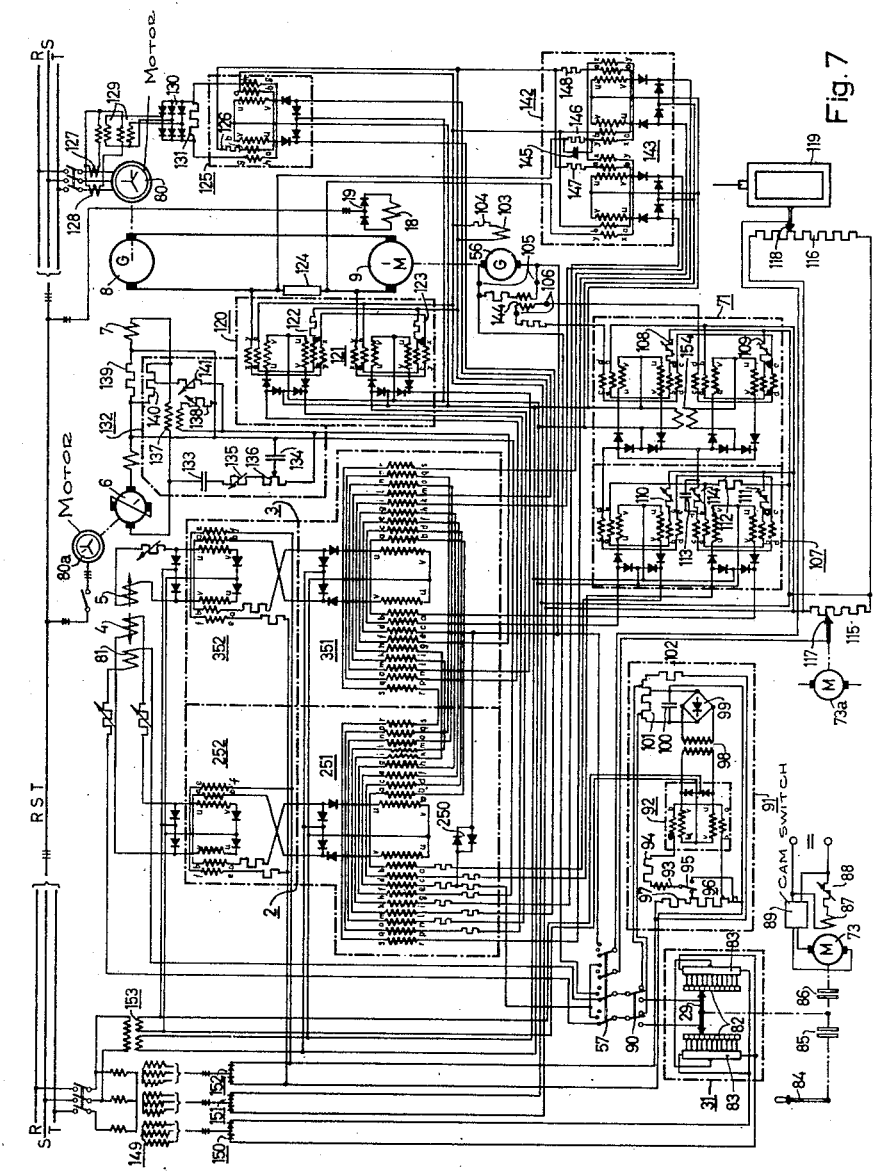

2,821,672

ELECTRIC CONTROL SYSTEMS FOR ELEVATORS, PARTICULARLY HIGH-SPEED PASSENGER ELEVATORS AND THE LIKE

Georg Sichling, Erlangen, Wilhelm Kafka, Tennenlohe, near Erlangen, and Hellmut Watzinger, Erlangen, Germany, assignors to Siemens-Schuckertwerke Aktiengesellschaft, Berlin-Siemensstadt, Germany, a German corporation Application August 19, 1953, Serial No. 375,256

Claims priority, application Germany August 25, 1952

19 Claims. (Cl. 318—146)

Our invention relates to electric hoisting systems and, in a more particular aspect, to high-speed elevator systems for passenger service and similar operations that, in contrast to ordinary elevators, are to run at different maximum speeds depending upon the particular travel distance to be traversed between two stops or landings.

The operating and control conditions to be satisfied in high-speed elevator and similar systems are especially exacting because large inertial masses are to be moved and accelerated in different directions and may vary within very wide limits. The conventional elevator controls, generally equipped with regulatable rheostats, contactors or cam controllers, when applied to high-speed passenger service, leave much to be desired as to uniformly satisfactory performance and they also require relatively large expenditures in equipment.

Relating to such exacting operating conditions, it is an object of our invention to secure a smooth travelling motion which, while traversing any particular travel distance at the shortest time possible, avoids disagreeable effects upon the passengers.

Another, subsidiary object is to achieve this result with a minimum of equipment and with the aid of static and rugged devices that secure a reliable response to a desired and predetermined program of operations.

According to our invention, we provide a hoist or elevator system, particularly for high-speed passenger or similar variable-load service, with an electric variable-speed drive motor and connect the motor in a control system which, for controlling and regulating the motor speed, contains at least one magnetic-amplifier input stage; and we energize this input stage in response to travel distance, travel velocity and acceleration, thus controlling the elevator drive in selective or sequential dependency upon these magnitudes. We effect this control by means of voltages that represent the respective reference or datum values for the regulating operation and that are adjusted in accordance with a predetermined travel program. For that reason, these voltages are hereinafter also referred to as "program voltages."

The drive motor is preferably a separately excited direct-current machine, and the armature circuit of this motor may be energized from a generator with which the motor forms a variable-voltage drive of the Ward-Leonard type. However, variable-speed motors of other types are also applicable, such as an alternating-current shunt motor. In the latter case, an additional motor is required which is connected to, and controled by, the output circuit of the amplifying device and which adjusts the rotary position of the commutator brushes in the A.-C. shunt motor to thereby control the revolving speed of the latter. When using a Ward-Leonard type drive, the magnetic amplifier may act upon the field excitation of the generator either directly or indirectly through an exicter machine or an amplifying machine. The magnetic amplifier may also act upon a controllable rectifier which energizes the elevator drive motor.

According to another feature of the invention, a program motor may be provided which, acting upon a potentiometer rheostat, adjusts a program voltage to thereby set the course of the elevator travel program. The varying or "sliding" program voltage, taken off the rheostat, represents the reference value for the speed regulation. The condition-responsive pilot voltages of the control system may be derived from a tachometer generator coupled with the elevator drive motor, or they may be derived from the armature voltage of the drive motor. In the latter case, the voltage drop (IR drop) in the armature circuit of the drive motor may be compensated by additionally controlling the magnetic amplifier by a compensating voltage proportional to the armature current of the drive motor. The condition-responsive pilot voltages and the program-determining datum voltages are imposed upon the input circuit of the magnetic amplifier so that the controlling and regulating performance is dependent upon the cumulative or differential resultant of these voltages.

The foregoing and more specific objects, advantages and features of the invention will be apparent from, and will be set forth in conjunction with the following description of the embodiments of hoist and elevator systems according to the invention exemplified on the drawings.

Fig. 7 is a schematic circuit diagram of a complete elevator system according to the invention.

Figure 1:
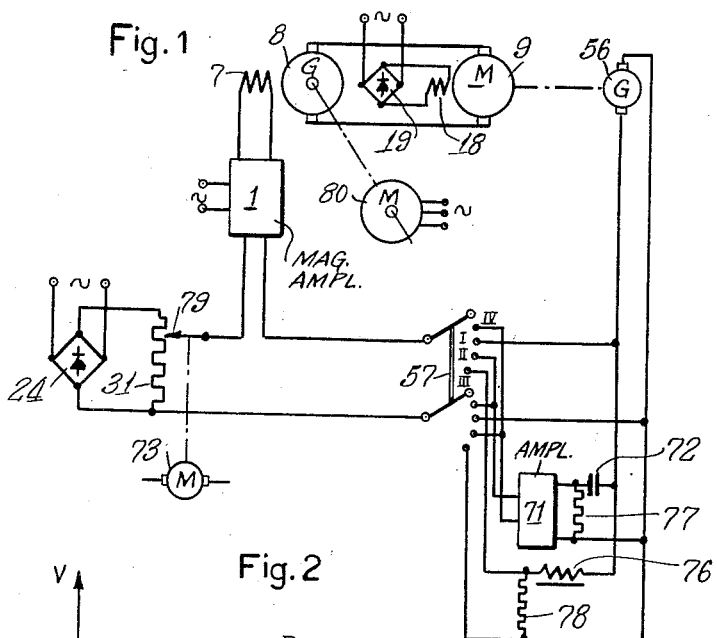
Fig. 1 shows in principle a schematic circuit diagram of a travel-distance, velocity, and acceleration responsive control system for an elevator drive.

For facility of understanding, each of the schematic circuit diagrams of Figs. 1, 2 to 6 and 8 to 11 shows only the elements essential to the particular representation, all further circuit components and details being apparent from respective other embodiments, particularly from the detailed system shown in Fig. 7. For distinction between otherwise similar symbols of dynamoelectric machines, the letter G has been used to denote generators and the letter M to denote motors, aside from the specific identification of these elements by the reference numerals mentioned in the following.

In Fig. 1 the main motor which drives the hoist or elevator is denoted by 9. This motor is a separately excited direct-current motor whose field winding 18 is excited by normally constant direct voltage, for instance from a rectifier set 19 energized from an alternating current source. The motor 9 has a common armature circuit with a generator 8 of a variable-voltage drive of the Ward-Leonard type. The generator 8 is driven from an alternating current motor 80, for instance of the asynchronous type, and operates normally at constant speed so that its output voltage and hence the speed of the drive motor 9 depend upon the excitation impressed upon the field winding 7 of the generator 8. Field winding 7 is excited from a plural-stage amplifier 1, shown only schematically in Fig. 1, whose input stage consists of a magnetic amplifier and is controlled in dependence upon the travel distance or position of the travelling car or cage, the velocity, and the acceleration. The amplifying device 1 operates as the regulating means for controlling the motor speed. The output leads of the amplifying device 1 are connected to the generator field winding 7. The input leads form part of a control circuit still to be described; and the power supply leads, shown extending toward the left, are connected to an alternating-current line that may also energize the above-mentioned rectifier set 19.

The control circuit comprising the input leads of the amplifier device 1 serves to compare the actual values (pilot values) of travel, velocity or acceleration with a reference value to thereby control and regulate the drive motor 9. To provide the necessary condition-responsive pilot voltages, a tachometer generator 56, coupled with the drive motor 9, provides a tachometer terminal voltage proportional to the motor velocity. This voltage, or a pilot voltage derived therefrom is compared with a reference voltage that is also effective in the control circuit of the amplifier device 1 and is tapped-off a potentiometer rheostat 31. Rheostat 31 is energized by direct voltage, for instance, from a rectifier set 24 connected to the above-mentioned alternating-current line. If desired, however, a separate direct-current source of constant voltage may be used for energizing the potentiometer rheostat 31. A selector switch 57 serves to selectively place the reference voltage from across a portion of rheostat 31 in series opposition to the pilot voltage derived from the tachometer generator 56. The pilot voltage and the reference voltage result in a differential "error" voltage that is impressed upon the input stage of the amplifying device 1 and determines the velocity of the elevator drive motor 9.

The switch 57 has several selectively adjustable positions. In position I, the control circuit is connected across the output terminals of the tachometer generator 56 so that the pilot voltage then being compared with the reference voltage from rheostat 31 is proportional to the motor velocity. With this setting of switch 57, therefore, the drive motor 9 is controlled in dependence upon its driving velocity. When switch 57 is placed in the position II, the tachometer generator 56 is connected with the control circuit through a differentiating circuit component here composed of a series capacitor 72 and a shunt resistor 77. The voltage across resistor 77 is proportional to the first differential quotient (rate of change) of the tachometer voltage and hence of the elevator travelling velocity; that is, the pilot voltage across resistor 77 varies in accordance with the acceleration of the elevator travel. The differentiating circuit component may also consist of a transformer or other suitable circuit means whose output voltage is proportional to the rate of change of the input voltage. With switch 57 in position II, the just-mentioned pilot voltage, properly dimensioned by means of an amplifier 71, is compared with the reference voltage from rheostat 31. In a similar manner, a pilot voltage proportional to the elevator travel distance can be derived from the velocity proportional voltage of tachometer generator 56 with the aid of circuit elements that form the time integral of the tachometer voltage. For providing such a voltage, the system according to Fig. 1 is shown equipped with a series reactor 76 and a shunt resistor 78 from which a distance responsive pilot voltage is taken and is compared with the reference voltage across rheostat 31 when switch 57 is in position III.

The travel, velocity and acceleration responsive regulation is effected in accordance with a given travel program. The datum or reference voltage for the regulation is provided by the above-mentioned variable program voltage from across the tapped-off portion of rheostat 31. The travel program is brought into action by a program motor 73. Motor 73 starts running in response to a control signal (supplied, for instance, from a switch in the elevator car) which also causes the drive motor 9 to start moving the elevator car. Motor 73, for instance, is a direct-current motor whose current-supply and control means are not illustrated in Fig. 1. The motor adjusts the slider 29 of the control rheostat 31 at a speed selected in accordance with the particular elevator travel distance so that the program voltage of rheostat 31 varies during the elevator travel in accordance with the preset program. During the operating period of the program motor 73 and also in accordance with the predetermined travel program, the switch 57 is placed into the different positions I to III. For instance, the control of switch 57 may be released by contact or other control devices mounted at a point of the travel path of the elevator car and controlled or actuated by the car. This may be done, for instance by mechanical, magnetically inductive, or optically controlled switching devices. It is also possible to control switch 57 by a car-position indicator or another facsimile of the car travel path. Since the particular manner in which switch 57 is controlled is not essential for the invention, these control means are not illustrated in Fig. 1. Various ways are available of providing the individual travel-responsive, velocity-responsive and acceleration-responsive pilot values. Thus, for instance, the pilot-voltage proportional to the travel distance or position, rather than being supplied from an integrating member that forms a time integral of a speed-responsive voltage, may also be directly formed in dependence upon the actual travel path. This may be done, for instance by placing along the travel path a potentiometer rheostat to be adjusted by the travel motion, or by providing a potentiometer rheostat which is adjusted by a facsimile of the travel path such as a position indicator. For these various possibilities, the potentiometer rheostat may be adjustable continuously or in steps. In the latter case, the potentiometer rheostat is to be provided with fixed taps which, if desired, may be controlled by respective individual contact devices rather than by displacing a tap contact.

It is furthermore within our invention to either impress the pilot values upon the input stage of the magnetic amplifier (in device 1) galvanically by voltage comparison as shown in Fig. 1, or to effect the comparison by superposition of ampere turns (magnetomotive forces). In the latter case, the program voltage and the pilot voltage to be compared with each other for controlling the regulation are supplied to respective control windings of the amplifying device 1, and these separate windings superimpose their respective magnetomotive forces upon each other.

Figure 2:
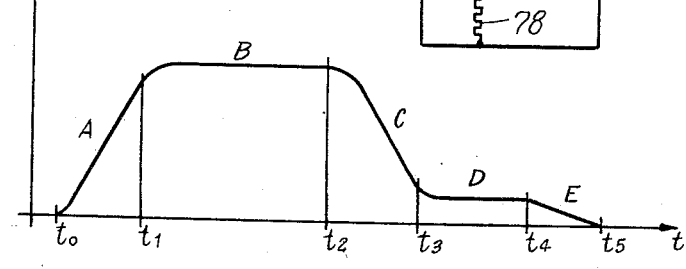
Fig. 2 is a graphical representation of elevator travel speed versus time as obtainable with a system according to the invention.

One of the various ways in which the travel program and the transfer between travel-responsive, velocity-responsive and acceleration-responsive regulation according to the invention may be executed, will now be exemplified with reference to the coordinate diagram of Fig. 2 representing the elevator travelling velocity V in dependence upon time $t$.

Assume that the starting signal for the elevator drive motor 9 be given at the moment $t_0$. At this moment, the slider 29 of control rheostat 31 is in its lowermost position and switch 57 is in position I. The program motor 73 also starts running in response to the starting signal or together with the starting drive motor 9. The pilot-voltage supply from tachometer generator 56 is now continuously compared with the increasing program voltage tapped-off from the control rheostat 31. The resultant differential voltage (error voltage) is impressed upon the magnetic input stage of the amplifying device 1, and the drive motor 9 is regulated to run at an increasing velocity determined by the speed with which the slider 79 is being displaced.

Since the adjusting speed or rate of change of the program voltage is proportional to the acceleration of the drive motor 9, an acceleration-responsive velocity regulation will at first take place. The acceleration, starting at moment $t_0$, increases at first only slowly until the straight portion of the curve section A (Fig. 2) is reached. Then, the program motor 73 has attained its maximum speed and continues running at constant speed. Hence, now the drive motor 9 is regulated for a speed increasing at constant acceleration. This acceleration is so chosen that no disagreeable forces are exerted upon the passengers riding the elevator car or that, when the system serves other hoisting purposes, no slipping of the elevator cable will occur. In the example of the travel program represented by Fig. 2, the run of program motor 73 is terminated and the slider 29 stopped at a moment $t_1$, for instance under control by a switch disposed in the elevator shaft or at the control rheostat 31. From then on, the speed of drive motor 9 is regulated for maintaining the velocity determined by the position of the now stationary slider 29. Consequently, the speed of motor 9 now remains constant in accordance with the horizontal curve section B. At the moment $t_2$, the program motor 73 is started to run in the opposite direction under control, for instance, by a switch mounted in the elevator shaftway. After the program motor has reached its maximum speed in the opposite direction, the slider 29 travels back to the starting position at uniform speed. This causes the drive motor 9 to be braked at a constant rate. At a result, the drive motor is again subjected to acceleration control as represented by the curve section C. At the moment $t_3$, shortly before slider 29 reaches the end position, the program motor 73 is disconnected so that the drive motor 9 is again velocity regulated for constant speed corresponding to the running speed of the elevator car. This continues up to the moment $t_4$ in accordance with the curve section D. Thereafter, the drive motor 9 is subjected to a distance or position responsive regulation initiated by placing at moment $t_4$ the switch 75 on position III. The drive motor 9 now continues running until the distance-responsive voltage across resistor 78 has reached the magnitude of the voltage remaining across the small tapped-off portion of the control rheostat 31. The drive motor 9 stops at the moment $t_5$, and the desired travel program is completed. Thereafter, slider 29 is returned to the initial position so that the system is prepared for a new starting signal.

The above-described course of the travel program is presented merely as an example. It is also possible to execute the travel program without the aid of the program motor 73 (Fig. 1). For this purpose, the slider 29 of rheostat 31 may be manually adjustable, for instance. According to another possibility, the program voltage may be switched during the course of a travel program onto a fixed voltage tapped-off the control rheostat 31. This may be elucidated by an example. Assume that the above-described conditions obtain at the beginning of a travel program, but that the switch 57 is now in position II. The travel program commences by immediately regulating the drive motor 9 for constant acceleration. For this purpose, the slider 29 is connected by a switch with a fixed voltage point of rheostat 31 that represents the maximum permissible acceleration. The actual acceleration of the elevator is now represented by the pilot voltage appearing across resistor 77 or across the output terminals of amplifier 7. This pilot voltage is compared with the constant reference acceleration represented by the fixed voltage at slider 29, and the differential error voltage is impressed upon the amplifying device 1. The drive motor 9 now runs at constant acceleration up to the moment $t_1$. At that moment, the switch 57 is moved to position I so that now the drive motor is regulated for constant velocity. At moment $t_2$, switch 57 is placed in position IV. This provides for acceleration regulation in the opposite sense so that the motor 9 is subjected to braking, until at moment $t_3$, the system is transferred to velocity regulation. To this end, the slider 29 is switched to a position corresponding to the desired landing speed, and the switch is returned to the position I. The subsequent landing and levelling of the car is in accordance with the distance-responsive regulation described previously.

Before describing a complete elevator system in detail, it appears helpful to first describe some applicable modifications dealing with the possibility of reversing the generator voltage of the Ward-Leonard drive for upward and downward travel with the aid of an amplifying device having at least a magnetic-amplifier input stage. As known, a magnetic amplifier in its basic form can vary its output voltage from zero to a finite value of only one polarity but cannot reverse the polarity of the output voltage. A control according to the present invention, however, requires energizing the elevator drive motor by a controllable and regulatable voltage of reversible polarity. To provide for such a reversible voltage with the aid of a magnetic amplifier, any one of the solutions according to Figs. 3 to 6 may be chosen, although it should be understood that other possibilities of using magnetic amplifiers for providing a reversible direct-current voltage may instead be applied.

Each of Figs. 3 to 6 shows only part of a system otherwise designed and operative in accordance with Fig. 1 or in accordance with the embodiments described in a later place with reference to Figs. 7 to 11. The reference numerals applied in Figs. 3 to 6 are identical with those applied in Fig. 1 to respectively similar circuit elements.

Figure 3:
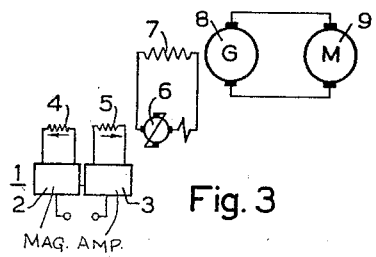

According to Fig. 3, the amplifying device 1 consists of a magnetic amplifier, for instance with two or more stages, of which only the output stage is illustrated. The output stage has two opposingly related branches 2 and 3 connected with two respective field windings 4 and 5 of an amplifying generator 6, for instance, of the cross-field (armature-reaction) excited type. The mutually opposed poling of the two amplifier branches and field windings is denoted by respective arrows. The opposingly related excitation serves for selectively controlling the voltage of the main generator 8 and hence the speed of the drive motor 9 in one or the other sense. The amplifying machine 6 supplies reversible excitation to the field winding 7 of the generator 8 from whose armature the motor 9 is energized. Aside from the last stage of the magnetic amplifying device, one or more of the preceding stages may also be designed for mutually opposed, push-pull operation. Instead of the amplifying dynamo 6, an ordinary exciter machine may be used. Departing from the illustration, the main generator 8 may also be equipped with two mutually differential field windings directly energized from the two branches 2 and 3 of the magnetic amplifier device 1, thus eliminating the intermediate generator 6. The two fields 4 and 5 are energized from a common control circuit. If desired, additional control circuits (not shown) may be provided for impressing upon the amplifier additional control values, for instance, to make the system also responsive to additional accelerations or decelerations. Such additional control circuits may also be connected to the preceding amplifying stages.

Figure 4:
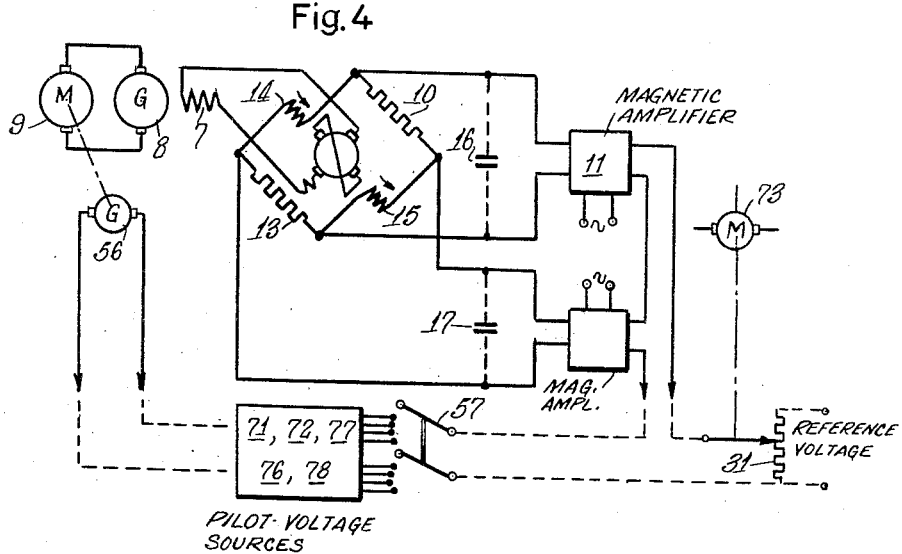
Figs. 3 to 6 are schematic circuit diagrams representing different respective modifications of the magnetic amplifying device shown in Fig. 1.

Fig. 4 shows a different way of producing a selectively positive or negative amplifier-output current for the respective directions of rotation of the drive motor. The illustrated magnetic amplifier stage comprises a bridge network with two magnetic amplifying devices being especially favorable in connection with elevator systems according to the invention. The network has four bridge arms of respectively equal resistances. Two opposite arms include each a field winding 14 or 15 of generator 6, while the two remaining arms include respective resistors 10 and 13. The magnetic amplifiers 11 and 12 are connected in the two diagonals of the bridge network. In contrast to the field windings 4 and 5 according to Fig. 3, the two field windings 14 and 15 are poled in the same sense. The output currents of the two magnetic amplifiers 11 and 12 subtract from each other in the windings 14 and 15, but add up in the resistors 10 and 13. Depending upon the control condition of the magnetic amplifiers 11 and 12, the two windings 14 and 15 are simultaneously traversed by either a positive or a negative excitation current of the same magnitude. For eliminating disturbances in bridge balance that may be due to the waviness of the amplifier-output currents, additional compensating means may be provided, for instance, capacitors 16 and 17 that are shunt connected in the respective output circuits of the magnetic amplifiers. Inserted between the magnetic amplifying device and the field winding 7 of the main Ward-Leonard generator 8 is an amplifying generator 6 as described previously with reference to Fig. 3.

Figure 5:
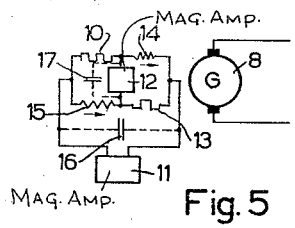

Fig. 5 shows the same magnetic amplifying device in bridge connection as is illustrated in Fig. 4. However, the field windings 14 and 15 according to Fig. 5 are formed directly by field windings of the main generator 8. If the same degree of amplification is desired as in the embodiment of Fig. 4, the magnetic amplifiers 11 and 12 may be given a correspondingly larger number of stages.

Figure 6:
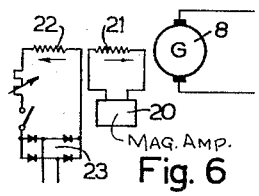

Fig. 6 shows a circuit in which, similar to Fig. 3, two mutually differential field windings 21 and 22 are provided. However, the amplifying device comprises only a one-way magnetic amplifier set 20 that acts upon the field winding 21, while the other field winding 22 may be continuously excited or it may be excited only when the elevator travel is to be accelerated or decelerated. The device according to Fig. 6, compared with those of Figs. 3 to 5, has the advantage of reduced expenditure in components and material. However, for reversing the excitation and therewith the direction of elevator travel, additional reversing means or switching means are required.

In the circuit diagram of the embodiment shown in detail in Fig. 7, the same reference numerals are applied as used in the other figures for elements of respectively similar functioning.

The elevator system according to Fig. 7 is equipped with a variable voltage drive as shown in all preceding embodiments. The drive motor 9 for operating the elevator car 119 has a field winding 18 separately excited through a rectifier set 19 from a three-phase alternating-current line R, S, T. The main generator 8 of the variable-voltage drive is driven by a three-phase motor 80 at constant speed. The field winding 7 of generator 8 is excited from an amplifying dynamo 6, for instance, of the cross-field excited type. Amplifying dynamo 6 is driven by a three-phase motor 80a at constant speed and has two control field windings 4 and 5 energized from two respective magnetic amplifiers 2 and 3. Each of amplifiers 2 and 3 has an input stage 251 or 351 and an end stage 252 or 352. The input stages 251 and 351 are each designed as an amplifying mixer. The respective stages of the two magnetic amplifiers 2 and 3 operate in counter rhythm or push-pull relation and excite the two control field windings 4 and 5 of the amplifying generator 6 in mutually opposing directions. Generator 6 has an additional field winding 81 for manual control of its excitation.

Each individual stage of the magnetic amplifiers 2 and 3 is bridge connected and has four valves (not designated by reference characters) connected in the four respective arms of the bridge network. The saturable reactors of each amplifier stage have alternating-current main windings and direct-current excitation windings disposed on saturable cores of magnetizable material. For distinction, the main windings are shown somewhat larger than the excitation windings and are individually denoted by $uv$. The same manner of representation and designation is also applied to the other magnetic amplifiers shown in Fig. 7 and described below. The premagnetizing excitation windings are likewise denoted by lower-case letters and represent in part control windings and in part bias windings for producing a constant premagnetization. Series-connected with the excitation windings are respective adjustable resistors (not designated by reference characters) that serve for balancing or calibrating the magnetic amplifier stages.

The output leads of the mixer stages 251 and 351 are connected with the control windings $ab$ of the respective end stages 252 and 352. The premagnetizing windings $ef$ of the respective amplifier stages are energized by constant current supplied from a rectifier bridge 152. The connection of the control windings $ab$, $cd$, $ef$, $gh$, $ik$, $lm$, $no$, $pq$ and $rs$ in the mixer stages 251 and 351 of the magnetic amplifier will be explained below in conjunction with the circuit components that energize these windings. Two opposingly parallel connected valves 250 are connected in shunt relation to the input circuit of the mixer stages 251 and 351, this input circuit comprising the two respective control windings $ef$. Valves 250 serve to limit the control current flowing in this circuit. That is, these valves prevent the occurrence of overload current that may occur under certain conditions, for instance when the drive motor 9 is stopped, thus preventing the occurrence of excessively great control signals as well as damage to the control windings $ef$. The input stages 251 and 351 operate as mixers in that all control values of the entire regulatory system, regardless of whether they are depending upon travel distance, velocity or acceleration, are all superimposed upon the same reactor core as respective magnetomotive forces or ampere turns. The resultant effect of the mixing is imposed upon the respective single main windings $uv$ of the two amplifier input stages 251 and 351. It will be recognized that, in contrast to the schematic example of Fig. 1, the embodiment of Fig. 7 involves a superposition of the respective control values in form of ampere turns.

The control potentiometer device 31 for providing the system with program voltage is shown in the left lower corner of Fig. 7. In contrast to Fig. 1, this control device comprises two resistor rheostats 82 and 83 with a mutually inverse voltage subdivision. The slider 29 forms two taps on the respective rheostats and may be adjusted selectively either by the program motor 73 or manually with the aid of a control lever 84. The selective adjustment is made possible by two couplings 85 and 86. The program motor 73 has a shunt-excited field winding 87. The excitation is constant and is adjustable by means of a resistor 88. A cam switch 89 serves for connecting and disconnecting the program motor 73 and is connected in the leads between the motor armature and the energizing current supply line (not illustrated). The switch 89 is actuated by the signal or command transmitter of the elevator system (not illustrated).

Aside from being controllable by the program motor 73 or the manual control lever 84, the illustrated elevator system may also be automatically controlled by an acceleration transmitter 91, operating without any movable switching mechanisms, in accordance with a predetermined program. To put this transmitter into automatic operation, a switch 90 is actuated to transfer the amplifier from the potentiometer rheostat device 31 to the acceleration transmitter 91. Transmitter 91 comprises essentially a magnetic amplifier 92 whose alternating-current main windings $uv$ are energized from the line R, S, T through a transformer 153. The control windings of magnetic amplifier 92 are excited, through a time-delay member consisting of a reactor coil 93 and a series-connected resistor 94, from a potentiometer resistor 96 energized by constant direct-voltage through an adjustable series resistor 97. A selector switch 95 permits connecting the premagnetizing excitation windings $ab$ of amplifier 92 to two respective voltages of different magnitudes and different polarities. One of these two voltages serves for controlling the acceleration of the drive motor, while the other voltage serves for controlling the deceleration. Consequently, two different alternating voltages are available for the primary circuit of the transformer 98 in the output stage of the magnetic amplifier 92. These two alternating voltages have a linearly increasing magnitude due to the reactor coil 93. The secondary voltages of transformer 98, whose increase is correspondingly linear, are rectified by a rectifier set 99 and are filtered by a shunt capacitor 100 before they are impressed as direct voltages upon a potentiometer resistor 101.

The output terminals of the potentiometer 101 are connected with the selector switch 90. An auxiliary voltage, adjustable by means of a resistor 102, is tapped off the entrance portion of a potentiometer 96 and is impressed upon the right-hand portion of the potentiometer 101. This auxiliary voltage has the purpose to permit a control of the magnetic amplifier 92 down to zero output.

The acceleration transmitter 91 thus operates without mechanical switching elements to automatically provide a variable-program voltage for the control of the magnetic amplifiers 2 and 3. The switching over, at switch 90, from manual control to automatic control or vice versa during the travelling motion of the elevator has no detrimental effects upon the system since, as will be explained below, various safety devices are provided to automatically impose certain limitations upon the control performance.

The pilot values for the acceleration and velocity regulation are derived from the output voltage of a tachometer generator 56 coupled with the drive motor 9. The tachometer generator is a direct-current dynamo to provide a positive or negative direct voltage depending upon the running direction of the drive motor 9. The tachometer generator 56 has a field winding 103 excited by direct-current of constant voltage. The field excitation is adjustable by means of a resistor 104.

The pilot voltage proportional to the velocity of the drive motor 9 is directly taken from across the output terminals 105 of the tachometer generator 56 and is supplied to the magnetic amplifiers 2 and 3 by impressing this voltage upon the respective control windings $ef$ of the respective end stages 351 and 352.

The acceleration-dependent pilot voltage is also derived from the terminal voltage of the tachometer generator. For this purpose, a transformer 144, acting as a differentiating member, has its primary connected across the terminals 105 in series with an adjustable resistor. The secondary voltage at the output terminals 106 of the transformer 144 is applied to an amplifier 71 which, in the illustrated embodiment, is likewise designed as a magnetic amplifier. Due to the amplification of the acceleration-responsive pilot voltage in amplifier 71, the regulation of the drive motor in dependence upon acceleration can be made just as sensitive as the velocity-responsive regulation. Connected to the output leads of amplifier 71 is another magnetic amplifier 107 which serves to prevent the acceleration-measuring values, occurring near the desired maximum acceleration, from increasing beyond a given permissible magnitude. That is, the magnetic amplifier 107 operates as an acceleration limiter whose performance utilizes the occurrence of saturation in the magnetizable cores of saturable reactors. When the value of acceleration is excessive, the magnetic amplifier 107 is saturated so that its output current cannot further increase.

The amplifier 71 and the acceleration-limiting magnetic amplifier 107 are connected for operation in counter rhythm. Hence, these two amplifiers are directionally sensitive and may deliver positive as well as negative voltages depending upon whether the drive motor 9 is driven or braked in one or the other direction.

A transformer 154 serves for galvanically separating the working circuits (alternating-current circuits) of the amplifier 71. The alternating-current main windings of amplifiers 71 and 107 are denoted by $uv$. The direct-current excitation windings in both amplifiers are denoted by $ab$ and $cd$. The windings $cd$ in amplifier 71 are control windings which are impressed by the acceleration-measuring pilot voltage, while the windings $ab$ produce a constant direct-current premagnetization adjustable by means of resistors 108 and 109. In the magnetic amplifier 107, the excitation windings $ab$ also produce a constant premagnetization adjustable by resistors 110 and 112. The windings $cd$ in amplifier 107 are energized from the output leads of amplifier 71 through a capacitor 113 and an adjustable resistor 114 parallel connected to capacitor 113. Windings $cd$ are the control windings of amplifier 107. The capacitor 113 produces an additional voltage in the control circuit which is proportional to the differential quotient (rate of change) of the acceleration and serves to damp or eliminate hunting. The output leads of the acceleration-limiting amplifier 107 are connected to the control windings $ab$ and $cd$ of the mixer amplifiers 251 and 351.

The travel-distance or position-responsive pilot voltage is taken off a potentiometer rheostat 116 shown in the lower right-hand corner of Fig. 7. Such a potentiometer rheostat is mounted in the elevator shaftway near each floor or landing. The pertaining movable slider 118 is connected with the car 119. The rheostat 116 is energized by constant direct voltage so that the pilot voltage tapped off at slider 118 is indicative of the travel distance or position of the car.

The program or reference voltage for the distance-responsive regulation of the elevator system is taken from another potentiometer rheostat 115 and is compared with the pilot voltage from rheostat 116. The two potentiometer rheostats 115 and 116 are energized from the same direct-voltage supply and form together a bridge network. The output diagonal of the bridge network, extending between sliders 117 and 118, supplies the control or error voltage for the distance-responsive regulation of the drive motor 9 and is impressed upon the control windings $ef$ of the mixer amplifiers 251 and 351. The transfer of the regulating performance to distance-responsive regulation is effected by two contacts in the selector switch 57. The same switch serves to selectively set the system for excitation of the field winding 81 by manual control, or for automatically regulated excitation of the field windings 4, 5 of amplifying generator 6. The slider 117 is adjusted by a program motor 73$a$ which, if desired, may be identical with the program motor 73. As explained, the slider 118 is displaced by the travelling car 119 to slide along the potentiometer rheostat 116 mounted shortly ahead of a floor or landing.

The system according to Fig. 7 is further equipped with means for limiting the current in the armature circuit of the Ward-Leonard set, and also with means for limiting the power applied to the three-phase drive motor 80 for the main generator 8. For producing these limiting effects, the saturation characteristic of magnetic amplifiers is utilized in a manner similar to that described with reference to the acceleration-limiting amplifier 91.

The just-mentioned limitation of the armature current of drive motor 9 is effected by a device 120 which becomes active when the elevator system runs under overload conditions. Device 120 comprises a magnetic amplifier 121 composed of two individual amplifying units that operate in push-pull relation to take care of polarity reversal occurring when the running direction of the drive motor 9 is being reversed. The main windings of the magnetic amplifier units in device 120 are denoted by $uv$, and the direct-current excitation windings for producing a constant premagnetization are denoted by $ab$. Two adjustable resistors 122 are provided for calibrating purposes. The control of the magnetic amplifier 121 is effected by the windings $xy$. One of windings $xy$ is energized by voltage from across resistor 124 series connected in the common armature circuit of generator 8 and motor 9. The output leads of the magnetic amplifier 121 are connected with the two control windings $no$ and $pq$ in each of the mixer amplifiers 251 and 351.

The above-mentioned power limit regulation is performed by a magnetic amplifier 125 with main windings $uv$ and direct-current excitation windings $ab$. Windings $ab$ apply a constant premagnetization that is adjustable by means of a resistor 121. The magnetic amplifier 125 is controlled by the current passing through the three-phase motor 80. To this end, two current transformers 127 and 128 are connected in the supply leads of motor 80. The secondary windings of the current transformers are connected through respective voltage transformers 129 to a three-phase rectifier bridge 130 whose output circuit extends across a resistor 131. The voltage impressed across resistor 131 excites the control windings $gh$ of the magnetic amplifier 125. The output leads of amplifier 125 are connected with the control windings $lm$ of the mixer amplifiers 251 and 351.

The devices shown at 132 and 142 comprise various groups of circuit components for resetting and stabilizing the regulating operation for preventing the occurrence of hunting. The device 132 comprises three different groups of return means which are individually connected, on the one hand, to the armature circuit of the amplifying generator 6 and hence to the field circuit of the main generator 8, and on the other hand to the control windings $gh$ of the mixer amplifiers 241 and 351. One of these groups consists of capacitors 133, 134 and two adjustable resistors 135 and 136 which together form a return control voltage depending upon the armature voltage of the amplifying generator 6 and hence also depending upon the voltage across the field winding 7 of the main generator 8. The two other groups of return control means in device 132 provide voltages that depend upon the armature current of the amplifying generator 6 and hence upon the field current of the main generator 8. One of the two latter groups includes a current transformer 137, preferably with an air gap in its magnetic flux path, and has an adjustable resistor 138 connected in the secondary circuit of the current transformer 137. The remaining group has a resistor 139 series connected in the armature circuit of the amplifying generator 6 and produces a control voltage dependent upon the current as well as upon the voltage of the amplifying generator 6. The superposition of the various return control voltages takes place in a voltage divider 140. A resistor 141 permits adjusting the magnitude of the jointly-dependent current and voltage-dependent control voltage.

The device 142 comprises return control means that produce a control value in dependence upon the current in the armature circuit common to the drive motor 9 and the main generator 8. For this purpose, the control windings $xy$ of a magnetic amplifier 143 are connected across a series resistor 124 in the just-mentioned armature circuit. The main windings of amplifier 143 are again denoted by $uv$. Also provided in amplifier 143 are direct-current excitation windings $ab$ for applying a constant premagnetization adjustable by means of resistors 147 and 148. A capacitor 145, connected parallel to a resistor 146 in the control circuit of the magnetic amplifier 143, superimposes upon the return control value a further control value proportional to the rate of change of the return control value. The output leads of the magnetic amplifier 143 are connected to the mixer amplifiers 251 and 351. By virtue of the combination of the three groups of return control means, a return performance especially advantageous for the regulation of the desired elevator operation is secured. Depending upon the particular application, however, the three groups of return control means need not be used simultaneously, it being in certain cases sufficient to provide the system with only one or two of these groups. The three groups of return control means of device 132 may act individually upon separate control windings of the magnetic amplifiers 2 and 3, or, as illustrated, they may act in parallel relation upon common control windings $en$.

In the system exemplified by Fig. 7, the alternating currents required for energizing the various magnetic amplifiers are all supplied from the three-phase line RST through a transformer 153. This transformer has two secondary windings so that the operating currents required for the counter rhythm or push-pull operation of the magnetic amplifiers are galvanically isolated from each other. The entire supply of direct-current energy, for instance for the premagnetization windings and control windings of the magnetic amplifiers and for energizing the various potentiometers are likewise taken from the three-phase line RST. In totality, three three-phase rectifier bridges 150 to 152 are provided which are all energized from a three-phase transformer 149 with three groups of secondary windings.

The source of reference or program voltage in systems according to the invention may be given a design and operation different from that described in the foregoing with reference to the program-voltage devices of Figs. 1 and 7. A particularly favorable modification of the source of program voltage is illustrated in Fig. 8.

Figure 8:
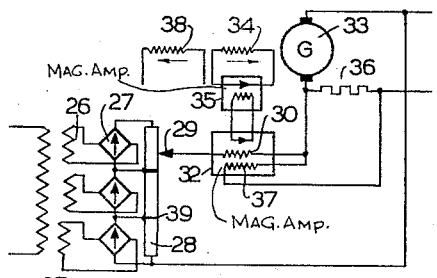
Figs. 8 to 11 show schematic circuit diagrams of different respective modifications of components and details applicable in a system according to the invention.

According to Fig. 8, a system otherwise similar to those described previously is equipped with a source of program voltage composed of a transformer 25 which has several, for instance three, secondary windings 26 connected to respective sets of rectifiers 27 preferably of the bridge type. The direct-current leads of the individual rectifier sets are connected to taps of a potentiometer resistor 28 from whose slider 29 the program voltages for the regulation of the drive motor are taken. The magnitudes of the rectifier output voltages may be different from each other. In the embodiment of Fig. 8, the program voltage is impressed upon the circuit of the control winding of a magnetic amplifier input stage 32 in series opposition to a pilot voltage which, in this case, is derived from the armature voltage of the main generator 33 for energizing the drive-motor (not illustrated in Fig. 8) of the elevator system. The generator 33 has a field winding 34 energized from a second magnetic amplifier stage 35 which is connected to the output leads of the input stage 32. For compensating the IR drop in the armature circuit of the variable-voltage drive, a voltage is taken from across a series resistor 36 in the armature circuit. This voltage is applied to another control winding 37 in the magnetic amplifier input stage 32. The resultant effect of the generator voltage and of the IR-drop voltage upon the input stage 32 is proportional to the motor speed. The generator 33 has another field winding 38 differentially related to the field winding 34. Winding 38 may be excited in accordance with the excitation of field winding 22 in Fig. 6, or it may be energized from a second counter-rhythm unit of the magnetic amplifier in accordance with the principle explained above with reference to windings 4 and 5 in Fig. 3 or Fig. 7.

The sectional energization of the program potentiometer (28 in Fig. 8) according to the invention results in a diminution of the so-called static regulating error and thereby affords a more accurately and precise regulating performance particularly with medium and small control values. This is because with such a sectionally energized potentiometer the resistance of the entire control circuit in which each program voltage is compared with the pilot voltage, is much smaller than with a program potentiometer rheostat energized only at its ends. It is advantageous to dimension the lowermost section of the program potentiometer so that the tap point denoted in Fig. 8 by 39 supplies the program voltage for landing or levelling the elevator car.

The sectional energization of the program potentiometer is of advantage not only in conjunction with systems as described in the foregoing but may also be used generally with various regulating devices to secure the just-mentioned advantages. The sectional energization according to the invention may also be applied in conjunction with other direct-voltage sources by providing these sources with corresponding voltage taps.

For executing the described travel program, the slider 29 (Fig. 8) of the program potentiometer 28 is displaced in accordance with the given program, for instance by means of a program motor as explained above with reference to motors 73 and 73a in Fig. 7. The displacement is such that the travel program is continuously steady in that undesired magnitudes of acceleration are prevented. The speed of displacement of slider 29 then corresponds to the acceleration reached by the drive motor, also as explained above with reference to Fig. 7.

It has been found possible under certain conditions that a continuously steady travel program free of excessive acceleration can also be obtained without necessitating a continuous displacement of the slider in a program potentiometer. According to another feature of our invention therefore the time constants of the regulating system, particularly the time delays in the regulating amplifying device and the magnitudes of the pilot values responsive to velocity and acceleration, are given such a relative dimensioning that the desired travel program is obtained and automatically maintained by a stepwise adjustment of a program value rather than by a continuous displacement or voltage adjustment. Despite the fact that a program motor is not required for the stepwise adjustment of the program voltage which may also be effected in a single step, the travel program controlled by a stepwise voltage control may nevertheless involve a complete hoisting or lowering cycle, including starting, accelerating, decelerating, and landing or levelling, just as is the case with a complete program of operation in a system as exemplified by Fig. 7.

For performing such a travel program, the individual program voltages are impressed upon the magnetic amplifier input stage and, if several different program voltages are employed, are given a proper time spacing from each other. By properly dimensioning the time constants of the entire device, particularly those of the components active in the regulation performance, and by adapting thereto the magnitudes of the pilot voltages responsive to velocity and acceleration, the travel program automatically follows the desired course. It is possible to provide for such a dimensioning that the speed between two stopping points follows a function which is similar to a sine $^2$ function within the range of 0 to $\pi$ or which, when the travel distance is very large so that the maximum speed is reached, corresponds to the squared sine function in the range from 0 to $\pi/2$ and in the range from $\pi/2$ to $\pi$ with an intermediate period of constant travelling speed. If the program voltages are tapped off a program potentiometer that, as described, is energized in sections, the sections are preferably so rated that the tap points of the sections represent the reference-voltage points of the travel program.

With the described stepwise change in program voltage, particularly when this change occurs in a single step, the control circuit of the magnetic amplifier input stage may tend to conduct excessively high currents due to large initial differences between program value and pilot value. To then prevent the occurrence of detrimental effects, particularly upon the control windings of the magnetic amplifier input stage, the source of program voltage may be equipped with current-responsive means, for instance premagnetized reactor coils, which cause the voltage at the program potentiometer to decline or increase when the control circuit of the input stage is traversed in one or the other direction by a detrimentally high current, that is, a current whose magnitude is several times as high as normal.

Figure 9:
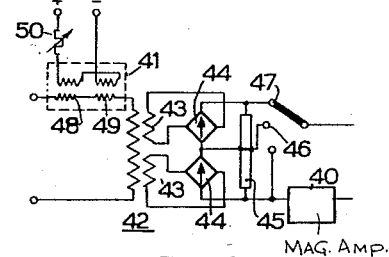

Fig. 9 presents an example of such a device for the prevention of excessive currents in the magnetic amplifier input stage. If, when starting a travel program, a given program voltage is impactwise applied to the control circuit this voltage drives through the circuit and through the control winding 40 of the magnetic amplifier input stage a relatively large current due to the absence at that moment of a counter-acting pilot voltage. For limiting this current surge, a limiting device 41 is provided. This device has premagnetized saturable reactors connected in series with a program-voltage supply device energized from an alternating-current line. The program voltage supply device comprises a transformer 42 with two secondary windings 43 and has two rectifier sets 44 connected to the respective windings 43 to sectionally energize a program potentiometer 45. The potentiometer 45 has two fixed taps 46 and 47 from which two different program voltages can be taken. Two reactor coils 48 and 49 are series connected with the primary windings of transformer 42. These reactors are premagnetized from a source of direct voltage, denoted by + and —, through an adjustable resistor 50. The premagnetization has such a magnitude that the reactance of the reactor coils 48 and 49 is normally low and increases upon occurrence of magnetic desaturation. Consequently, when the current exceeds a certain value, the reactors 48 and 49 abruptly increase their reactance so that the secondary voltage of transformer 42 drops and prevents the current flowing through the control winding 40 of the magnetic amplifier input stage from exceeding a permissible value.

Aside from limiting an excessive control current caused by preponderance of program voltage, it is also possible to provide for limitation of excessive control current caused by any occurrence of excessive pilot voltage. An excessive pilot voltage may occur in the controlling input circuit of the magnetic amplifier stage when a previously effective program voltage is switched off for automatic deceleration of the elevator travel. At the first moment, the still fully effective pilot voltage is preponderant and may drive an excessive current through the circuit.

It will be recognized that in the above-described system the program voltage has an automatically variable magnitude which depends upon the difference between program voltage and pilot voltage as well as upon the direction of that difference. Such a "sliding" reference voltage, regardless of the particular means used for producing the sliding effect, may be applied not only to the particular embodiments herein described but also generally to other controlling or regulating systems.

Figure 10:
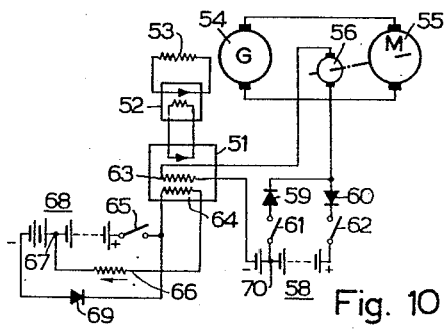

The embodiment illustrated in Fig. 10 relates to the above-mentioned automatic execution of the travel program by means of a stepwise adjustment of the program value. The field winding 53 of the main generator 54 for energizing the drive motor 55 in a Ward-Leonard system is excited from a magnetic amplifier device comprising, for instance, two amplifiers stages 51 and 52. The input stage has a control winding 64 connected through a control contact 65 across a tapped-off portion of a reference-voltage source 68. Connected between the tap 67 of source 68 and the control winding 64 of the magnetic amplifier stage 51 is a device for limiting the rate of current change. This limiting device may consist of a series connected inductance member 66. The left-hand, negative pole of the reference-voltage source 68 is connected with the control winding 64 through a valve 69 poled to normally block the flow of current from the source. A second control winding 63 of the amplifier input stage 51 is connected through a second reference-voltage source 58, a valve 60 and a control contact 62 to a source of voltage proportional to the speed of the elevator drive motor 55, the latter source consisting, for instance, of a direct-current tachometer dynamo 56. The second reference-voltage source 58 serves for limiting the motor speed and is connected in series opposition to the tachometer dynamo 56. Another control contact 61 and a series connected valve 59 poled in opposition to valve 60 are connected between the tachometer dynamo 56 and a tap 70 of source 58. While the voltage sources 58 and 68 are schematically shown as accumulator batteries, they may also consist of reference-voltage potentiometers, similar to those according to Fig. 9, that are energized through rectifiers from an alternating-current line.

For the initiation of an automatically evolving travel program, the contacts 62 and 65 are closed. This causes the drive motor 55 to be started and accelerated. Due to the action of inductance member 66, the magnetizing current in control winding 64 of amplifier 51 increases slowly to its maximum value substantially in accordance with a mathematic e-function. The inductance of member 66 is so rated that the degree of control imposed upon the magnetic amplifier device, and hence the starting performance of the elevator travel caused by the increase in current, are in accordance with the desired operating conditions. The velocity-proportional voltage generated by the tachometer dynamo 56 increases without at first imposing a controlling effect upon the magnetic amplifier. However, as soon as this tachometer voltage exceeds the voltage tapped-off from the reference-voltage source 58, a second, opposingly acting control effect is imposed upon the input stage 51 of the amplifying device. The voltage tapped-off from source 58 is rated so that the two control effects form a continuous and steady sequence. Both effects eventually combine to control the drive motor for constant velocity which remains in effect up to the initiation of the deceleration and landing performance.

For starting the deceleration and landing performance, contacts 65 and 62 are opened and contact 61 is closed. Immediately after the switching, the current that before this moment had been flowing through the control winding 64 is at first maintained at its full height due to the return flow of energy stored in the inductance member 66. This return flow of current passes through the left portion of the reference-voltage source 68 in opposition to the direction of the source voltage. Gradually however, the control effect of control winding 64 declines to the vanishing point. The voltage of the left portion of source 68 is so rated that the desired deceleration of the elevator travel will result. The tap 67 permits adjusting the course of the deceleration. When initiating the deceleration performance, contact 61 inserts the valve 59 into the circuit of control winding 63. Due to the blocking action of valve 59, the voltage of the tachometer dynamo 56, decreasing gradually and continuously during the decelerating period, cannot at first exert a control effect upon winding 63. Such a control effect becomes effective only after the voltage of tachometer dynamo 56 has dropped below the voltage of the left portion of source 58. From then on a magnetizing current flows through control winding 63 in opposition to the magnetizing current previously effective during the speed-limiting action. The magnetic amplifier device is given a control characteristic corresponding to the desired landing or levelling speed. The levelling and stopping of the elevator at the floor or landing can be released in the conventional manner by a suitable device. The control effects during the deceleration and landing performance are likewise so rated that they form a continuous and steady sequence and that the resulting travel program prevents the occurrence of disagreeable inertia effects upon the passengers.

Figure 11:
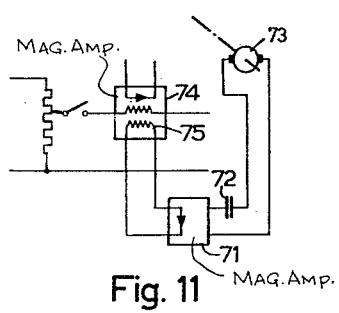

Fig. 11 illustrates another possibility, applicable in control systems otherwise as described previously, for providing an acceleration-proportional pilot value. The tachometer generator 73, coupled with the drive motor to be controlled, provides a voltage proportional to the motor velocity. This voltage is differentiated, for instance, by means of a capacitor 72 so that the resulting output voltage is proportional to the rate of velocity change and hence to the acceleration of the elevator travel. This resulting voltage is amplified by a pre-amplifier 71 and is supplied to the magnetic amplifier input stage or if desired to the next following stage of the amplifying device 74 that serves for effecting the above-described automatic speed regulation. According to another feature of the invention, the acceleration-proportional pilot magnitude is advantageously so applied that the pertaining control winding 75 of the magnetic amplifier input stage can conduct current only when the acceleration or deceleration during the elevator travel exceeds a given value. This avoids excessive magnitudes of acceleration and deceleration and secures a continuously steady travel motion without annoyance to the passengers. Among the possibilities for thus limiting the acceleration are the following. The acceleration-proportional pilot value may be placed in series opposite to a separate constant voltage for instance through a valve. Then, if the acceleration reaches an excessive value, the acceleration-proportional pilot voltage exceeds the counter voltage of the valve. Only then has the acceleration-proportional voltage a controlling effect which acts in a limiting sense upon the amplifier device. Another advantageous possibility consists in providing an additional amplifier, preferably a magnetic amplifier, which is pre-controlled in the just-mentioned manner so that it delivers output current only when the acceleration-proportional pilot voltage becomes excessively large.

A system according to the invention may be provided with means for compounding the interior resistive voltage drop in the armature of the drive motor. According to another feature of the invention, the compounding effect may be provided by means of a pilot value derived from the armature current of the drive motor and amplified in another additional pre-amplifier, preferably also a magnetic amplifier, before being introduced into the regulating amplifier device proper. Preferably, this compounding voltage is directly and galvanically imposed upon the same amplifier control circuit in which the pilot voltage proportional to the armature voltage is effective for automatic speed regulation. The compounding thus obtained secures a continuously steady elevator operation and simultaneously prevents undesired hunting apt to occur in compounded systems.

It is of advantage in certain cases to make the compounding fully effective at low motor speeds but to weaken or prevent the compounding action at higher speeds. According to another feature of the invention therefore, the system may be equipped with means that prevent the automatic regulation at high travel speeds and when the motor speed is building up. Under such conditions, the control is effected by subjecting the amplifying device or the Ward-Leonard generator or a controllable rectifier to control by a resistance regulator, such as a regulator controlled by a collector switch, so that this regulator controls the voltage supplied to the drive motor. Another way of controlling the motor during periods in which the automatic regulation is prevented, is to vary the armature voltage of the drive motor by energizing it from a controllable rectifier and changing the alternating supply voltage of the rectifier, for instance, by a controllable transformer of the slider type or of the rotary type.

It will be obvious to those skilled in the art upon a study of this disclosure that our invention permits of various and diversified modifications and may be embodied in systems other than those specifically illustrated and described, without departing from the essential features of our invention and within the scope of the claims annexed hereto.

We claim:

1. A hoist drive system, particularly for high-speed passenger elevators and the like, comprising a speed-controllable drive motor, amplifying control means connected to said drive motor for controlling the motor speed and having at least an input stage consisting of a magnetic amplifier, three pilot-voltage supply means having pilot voltages variable in dependence upon hoist travel distance, velocity and acceleration respectively, selective control means connecting one of said pilot-voltage supply means at a time with said amplifier input stage, reference-voltage supply means having adjustable reference voltage and being connected with said amplifier input stage in differential relation to said respective pilot voltages whereby said motor is jointly controlled by a selected one of said pilot voltages and said reference voltage, voltage control means for adjusting said reference voltage, and programming means connected with said selective control means and said voltage control means for correlated control of both in accordance with a desired program.

2. A hoist drive system, particularly for high-speed passenger elevators and the like, comprising a speed-controllable drive motor, amplifying control means connected to said drive motor for controlling the motor speed and having at least an input stage consisting of a magnetic amplifier, three pilot-voltage supply means for providing condition-responsive pilot voltages dependent upon travel distance, velocity and acceleration respectively of said motor, selective contact means connecting a selected one of said respective pilot-voltage supply means at a time with said amplifier input stage in accordance with a desired program for starting, accelerating, decelerating and stopping said motor, reference-voltage supply means also connected with said amplifier input stage for supplying it with reference voltage, and voltage control means connected with said reference-voltage supply means for varying the reference voltage in accordance with said program, whereby the operation of said drive motor is regulated during the course of said program, in accordance with the resultant effect of said varying reference voltage and selected different ones of said pilot voltages.

3. A hoist drive system, particularly for high-speed passenger elevators and the like, comprising a speed-controllable drive motor, amplifying control means connected to said drive motor for controlling the motor speed and having at least an input stage consisting of a magnetic amplifier, three pilot-voltage supply means for providing condition-responsive pilot voltages dependent upon travel distance, velocity and acceleration respectively of said motor, selective contact means connecting a selected one of said respective pilot-voltage supply means at a time with said magnetic amplifier in accordance with a desired program for starting, accelerating, decelerating and stopping said motor, reference-voltage supply means comprising an adjustable potentiometer device having a tapped-off portion connected with said magnetic amplifier for supplying it with reference voltage, and a program-determining motor drivingly connected with said potentiometer device for varying said portion and said reference voltage, whereby the operation of said drive motor is regulated during the course of said program in accordance with the resultant effect of said varying reference voltage and selected different ones of said pilot voltages.

4. In a drive system according to claim 1, said reference-voltage supply means having a step-wise adjustable reference voltage, and said amplifying control means having inherent time delay rated relative to said reference voltage and pilot voltages in accordance with a continuously variable change in amplified output voltage corresponding to said desired program.

5. In a drive system according to claim 2, said voltage control means having a single step of voltage adjustment, and said amplifying control means having inherent time delay rated relative to said reference voltage and pilot voltages in accordance with a continuously variable change in amplified output voltage corresponding to said desired program.

6. In a drive system according to claim 1, said reference-voltage supply means having a step-wise adjustable reference voltage, and said amplifying control means having inherent time delay rated relative to said reference voltage and pilot voltages in accordance with a continuously variable motor speed characteristic similar to a squared sine wave within the ranges of 0 to $\pi/2$ and $\pi/2$ to $\pi$ with an intermediate wave portion of substantially constant amplitude.

7. A hoist drive system, particularly for high-speed passenger elevators and the like, comprising a direct-current drive motor and a variable-voltage generator having an armature circuit in common, said generator having a field circuit, an auxiliary generator connected with said field circuit and having control field means, amplifying control means connected with said field means for exciting said field means and having an input stage formed by a magnetic amplifier, pilot-voltage supply means for providing condition-responsive pilot voltages dependent upon travel distance, velocity and acceleration respectively of said motor, selective contact means connecting a selected one of said respective pilot-voltage supply means at a time with said magnetic amplifier in accordance with a desired program for starting, accelerating, decelerating and stopping said motor, reference-voltage supply means also connected with said magnetic amplifier for supplying it with reference voltage, and voltage control means connected with said reference-voltage supply means for varying the reference voltage in accordance with said program, whereby said drive motor is controlled during the course of said program in accordance with the resultant effect of said varying reference voltage and selected different ones of said pilot voltages.

8. In a drive system according to claim 7, said control field means of said auxiliary generator comprising two opposingly interrelated field windings, and said magnetic amplifier having two branches poled in opposed relation to each other for exciting said respective control field windings.

9. In a drive system according to claim 1, said reference-voltage supply means comprising a transformer having a plurality of secondary windings, a potentiometer device having a plurality of consecutive sections, a plurality of rectifier means connecting said secondary windings with said respective sections to separately impress respective direct-voltage magnitudes thereon, and said potentiometer device having tap means displaceable relative to said sections to tap a variable total reference voltage off said device.

10. A system according to claim 1, comprising current-responsive regulating means connected with said amplifier input stage to provide a regulatory voltage when the input current of said stage reaches an overload value, said regulating means being connected with said reference-voltage supply means for correctively varying said reference voltage in response to occurrence of said overload value.

11. A system according to claim 1, comprising a saturable reactor device connected with said reference-voltage supply means for modifying said reference voltage in dependence upon reactance changes of said reactor device, said reactor device having a direct-current excitation circuit for controlling said reactance, and current-responsive circuit means connected with said amplifier input stage and connected with said excitation circuit to provide it with excitation dependent upon the current of said input stage to correctively vary said reference voltage when said current reaches overload values.

12. In a drive system according to claim 1, said amplifier input stage having two coactive control circuits, said pilot-voltage supply means and said reference-voltage supply means being connected to one of said control circuits in series opposition to each other for controlling said magnetic amplifier by differential error voltage, said one control circuit comprising valve means for determining the polarity of said error voltage, a source of direct voltage, switch means for connecting and disconnecting said source relative to said other control circuit, and current limiting means connected in said other control circuit for securing therein a current change in accordance with a given rate of change.

13. A hoist drive system, particularly for high-speed passenger elevators and the like, comprising a variable-speed drive motor, a power source of controllable energizing voltage, said drive motor having an armature circuit connected to said source, an amplifying control device connected to said source for controlling said energizing voltage to thereby control the speed of said drive motor, said device having an input stage constituted by a magnetic amplifier, pilot-voltage supply means connected with said magnetic amplifier for supplying it with condition-responsive pilot voltages dependent upon travel distance, velocity and acceleration respectively of said drive motor, a circuit member connected in said armature circuit to provide a compensating voltage variable in response to the current flowing in said armature circuit, said magnetic amplifier having a control circuit connected with said circuit means that are connected across said armature circuit, and an auxiliary amplifier having an input side connected to said circuit member and having an output side connected with said control circuit for impressing a corresponding voltage upon said latter circuit.

14. In a drive system according to claim 1, one of said pilot-voltage supply means comprising a tachometer dynamo coupled with said drive motor to generate said velocity-dependent pilot voltage, another one of said pilot-voltage supply means consisting of circuit means connected to said dynamo and being responsive to the rate of change of said velocity-dependent pilot voltage, and the third pilot-voltage supply means consisting of circuit means connected to said dynamo and being responsive to the rate of change of said velocity-dependent pilot voltage to provide said acceleration-dependent pilot voltage.

15. A hoist drive system, particularly for high-speed passenger elevators and the like, comprising a variable-speed drive motor, a power source of controllable energizing voltage, said drive motor having an armature circuit connected to said source, an amplifying control device connected to said source for controlling said energizing voltage to thereby control the speed of said drive motor, said device having an input stage constituted by a magnetic amplifier, a first pilot-voltage supply means having a pilot voltage variable in dependence upon hoist travel distance, a second pilot-voltage supply means comprising a circuit member connected across said armature circuit to derive from the armature voltage a pilot voltage variable in dependence upon motor speed, a third pilot-voltage supply means connected to said second pilot-voltage supply means to derive therefrom a pilot voltage variable in dependence upon acceleration, selective control means connecting one of said pilot-voltage supply means at a time with said amplifier input stage, a compensating circuit having a member series connected in said armature circuit and being connected to said magnetic amplifier for providing a corrective voltage for compensating the IR drop of said armature circuit, reference-voltage supply means having adjustable reference voltage and being connected with said amplifier input stage in differential relation to said respective pilot voltages whereby said motor is jointly controlled by a selected one of said pilot voltages jointly with said reference voltage and said corrective voltage, voltage control means for adjusting said reference voltage, and programming means connected with said selective control means and said voltage control means for correlated control of both in accordance with a desired program.

16. A hoist drive system, particularly for high-speed passenger elevators and the like, comprising a variable-voltage drive having a drive motor and a generator having an armature circuit in common, said generator means having two cumulative field windings for controlling the voltage of said armature circuit, two magnetic amplifiers having respective input circuits in common, a resistance-balanced bridge network having four bridge arms and two pairs of diagonal points, said two field windings being connected in two opposite ones of said bridge arms respectively, two resistors connected in said other two arms respectively, said two magnetic amplifiers having respective output circuits connected across said respective pairs of diagonal points; three pilot-voltage supply means having pilot voltages variable in dependence upon hoist travel distance, velocity and acceleration respectively, selective control means connecting one of said pilot-voltage supply means at a time with said amplifier input circuits, reference-voltage supply means having adjustable reference voltage and being connected with said amplifier input circuits whereby said motor is controlled jointly by a selected one of said pilot voltages and said reference voltage, voltage control means for adjusting said reference voltage, and programming means connected with said selective control means and said voltage control means for correlated control of both in accordance with a desired program.

17. In a drive system according to claim 1, said amplifier input stage having two coactive control circuits, said pilot-voltage supply means and said reference-voltage supply means being connected to one of said control circuits in series opposition to each other for controlling said magnetic amplifier by differential error voltage, said one control circuit comprising valve means for determining the polarity of said error voltage, a source of direct voltage, switch means for connecting and disconnecting said source relative to said other control circuit, and an inductance member series connected in said other control circuit so that the rate of current change in said other control circuit corresponds substantially to a mathematical e-function.

18. In a system according to claim 1, said magnetic amplifier having a control winding, a circuit connecting said control winding with said pilot-voltage supply means of acceleration-dependent pilot voltage, and limit control means connected with said latter circuit for permitting the flow of current from said latter pilot-voltage supply means through said winding only when said acceleration-dependent pilot voltage exceeds a given value, said limit control means comprising a source of constant voltage and a valve connecting said source in series-opposed voltage relation to said acceleration-dependent pilot-voltage supply means.

19. In a system according to claim 1, said magnetic amplifier having a control winding, a circuit connecting said control winding with said pilot-voltage supply means of acceleration-dependent pilot voltage, and limit control means connected with said latter circuit for permitting the flow of current from said latter pilot-voltage supply means through said winding only when said acceleration-dependent pilot voltage exceeds a given value, said limit control means comprising a controllable auxiliary amplifier having a pre-set bias to conduct current in said control circuit only when said acceleration-dependent pilot voltage exceeds a value determined by said bias.

References Cited in the file of this patent
UNITED STATES PATENTS

| | | |
|---|---|---|
| 2,519,339 | Avery | Aug. 22, 1950 |
| 2,600,308 | Lund et al. | June 10, 1952 |